United States Patent
Bland et al.

(10) Patent No.: US 11,688,005 B2
(45) Date of Patent: *Jun. 27, 2023

(54) ORDER EXECUTION QUALITY OF FINANCIAL MARKET TRANSACTIONS UTILIZING AN ADJUSTED Z-SCORE BENCHMARK

(71) Applicant: FIDESSA TRADING UK LIMITED, London (GB)

(72) Inventors: Bruce Bland, Chesham (GB); Daniel Nicholass, Carshalton (GB); Oleh Danyliv, London (GB); Christian Voigt, Teddington (GB)

(73) Assignee: FIDESSA TRADING UK LIMITED, London (GB)

( * ) Notice: Subject to any disclaimer, the term of this patent is extended or adjusted under 35 U.S.C. 154(b) by 10 days.

This patent is subject to a terminal disclaimer.

(21) Appl. No.: 17/003,189

(22) Filed: Aug. 26, 2020

(65) Prior Publication Data
US 2020/0387970 A1 Dec. 10, 2020

Related U.S. Application Data

(63) Continuation of application No. 16/430,220, filed on Jun. 3, 2019, now Pat. No. 10,789,648, which is a (Continued)

(51) Int. Cl.
*G06Q 40/04* (2012.01)
*G06Q 10/0639* (2023.01)
*G06Q 40/06* (2012.01)

(52) U.S. Cl.
CPC ....... *G06Q 40/04* (2013.01); *G06Q 10/06395* (2013.01); *G06Q 40/06* (2013.01)

(58) Field of Classification Search
CPC .... G06Q 40/04; G06Q 30/0201; G06Q 40/00; G06Q 40/06
See application file for complete search history.

(56) References Cited

U.S. PATENT DOCUMENTS 6,766,304 B2 * 7/2004 Kemp, II ............... G06Q 40/04
 715/814
6,772,132 B1 * 8/2004 Kemp, II ............... G06Q 40/00
 715/814

(Continued)

OTHER PUBLICATIONS

Kissel, Robert, The Science of Algorithmic Trading and Portfolio Management—Chapters Algorithmic Cost Analysis Elsevier, 2014 (Year: 2014).*

(Continued)

*Primary Examiner* — Scott L Jarrett
(74) *Attorney, Agent, or Firm* — Baker Botts L.L.P.

(57) ABSTRACT

The present disclosure generally provides techniques for analyzing and displaying the order execution quality of market instruments traded during a relevant period, or lifetime, of the order. The utilization of quote information in calculating a normalization factor allows for comparisons across instruments, orders, and days for instruments with a publicly available price irrespective of executed volume. A calculated Z score illustrates the quality of an order execution for a specific traded time as compared to all possible random executions. Moreover, the techniques disclosed herein allow for the comparison of execution quality across market instruments, orders sizes, and other variables via a graphical user interface and other data visualization tools, and can encapsulate evaluation methods using other adjusted Z score thresholds and/or alternatively take into account desirable volume weighting when calculating the standard deviation.

10 Claims, 3 Drawing Sheets

Related U.S. Application Data continuation of application No. 15/473,968, filed on Mar. 30, 2017, now Pat. No. 10,346,917.

(60) Provisional application No. 62/317,872, filed on Apr. 4, 2016.

(56) References Cited

U.S. PATENT DOCUMENTS

| | | | |
|---|---|---|---|
| 6,963,855 B1 | 11/2005 | Borzenko | |
| 7,218,325 B1 | 5/2007 | Buck | |
| 7,461,023 B1 | 12/2008 | Helweg | |
| 7,617,149 B2 | 11/2009 | Rosenthal et al. | |
| 7,698,200 B2 | 4/2010 | Janian | |
| 7,720,742 B1 | 5/2010 | Mauro et al. | |
| 7,801,784 B2 | 9/2010 | Bandman et al. | |
| 7,818,246 B2* | 10/2010 | Cushing | G06Q 40/06 705/37 |
| 7,831,503 B2 | 11/2010 | Chiulli et al. | |
| 7,904,376 B2 | 3/2011 | Shapiro et al. | |
| 7,991,672 B2 | 8/2011 | Crowder | |
| 8,280,802 B1 | 10/2012 | Cervo | |
| 8,301,535 B1* | 10/2012 | Zerenner | G06Q 40/06 705/36 R |
| 8,521,637 B2* | 8/2013 | Brandes | G06Q 40/08 705/37 |
| 8,533,098 B2 | 9/2013 | Sutton | |
| 8,548,892 B2 | 10/2013 | Howorka et al. | |
| 8,589,277 B2 | 11/2013 | Singer et al. | |
| 8,682,777 B1 | 3/2014 | Epstein et al. | |
| 8,838,604 B1 | 9/2014 | Osinga | |
| 9,152,997 B2 | 10/2015 | Sellers, Jr. | |
| 9,613,309 B1 | 4/2017 | Apreleva et al. | |
| 9,875,004 B2 | 1/2018 | Barry | |
| 9,959,573 B2 | 5/2018 | Bland et al. | |
| 10,037,574 B2 | 7/2018 | Decker et al. | |
| 10,062,111 B2 | 8/2018 | Lutnick et al. | |
| 10,346,917 B2* | 7/2019 | Bland | G06Q 40/04 |
| 10,789,648 B2* | 9/2020 | Bland | G06Q 40/06 |
| 2002/0073017 A1 | 6/2002 | Robertson | |
| 2002/0091606 A1* | 7/2002 | Shapiro | G06Q 40/04 705/36 R |
| 2003/0074292 A1* | 4/2003 | Masuda | G06Q 10/10 705/35 |
| 2003/0187771 A1 | 10/2003 | Bulan | |
| 2004/0215549 A1* | 10/2004 | Madhavan | G06Q 40/06 705/37 |
| 2005/0091148 A1 | 4/2005 | Rotondo | |
| 2005/0228735 A1 | 10/2005 | Duquette | |
| 2005/0234799 A1* | 10/2005 | Hansen | G06Q 40/04 705/37 |
| 2006/0069636 A1* | 3/2006 | Griffin | G06Q 40/00 705/37 |
| 2006/0080215 A1* | 4/2006 | Warsaw | G06Q 40/04 705/37 |
| 2006/0178981 A1 | 8/2006 | Janian | |
| 2006/0184444 A1* | 8/2006 | McConaughy | G06Q 40/00 705/37 |
| 2006/0259394 A1 | 11/2006 | Cushing et al. | |
| 2007/0005481 A1* | 1/2007 | Kedia | G06Q 40/04 705/37 |
| 2007/0076002 A1 | 4/2007 | Heaton | |
| 2007/0088648 A1* | 4/2007 | Mather | G06Q 40/06 705/36 R |
| 2007/0100722 A1* | 5/2007 | Ferguson | G06Q 40/04 705/36 R |
| 2007/0150407 A1 | 6/2007 | Gilboy | |
| 2007/0265954 A1 | 11/2007 | Mather et al. | |
| 2007/0271172 A1* | 11/2007 | Shapiro | G06Q 40/00 705/37 |
| 2008/0077538 A1 | 3/2008 | Schebece | |
| 2008/0086401 A1 | 4/2008 | Mather | |
| 2008/0250326 A1 | 10/2008 | Mather | |
| 2009/0076981 A1 | 3/2009 | Schonberg | |
| 2009/0228399 A1 | 9/2009 | Connors et al. | |
| 2010/0125534 A1 | 5/2010 | Brandes et al. | |
| 2010/0250425 A1* | 9/2010 | Sweeting | G06Q 40/04 705/37 |
| 2010/0268634 A1* | 10/2010 | Mackey, Jr. | G06Q 40/04 705/37 |
| 2011/0178950 A1 | 7/2011 | Parga Landa | |
| 2012/0143742 A1* | 6/2012 | Doherty | G06Q 40/04 705/37 |
| 2012/0150713 A1* | 6/2012 | Russel | G06Q 40/04 705/37 |
| 2013/0325687 A1* | 12/2013 | Lavalle | G06Q 40/04 705/37 |
| 2015/0371329 A1 | 12/2015 | Davies et al. | |
| 2017/0287069 A1* | 10/2017 | Bland | G06Q 40/04 |

OTHER PUBLICATIONS

Jonsson, Jan, Measuring Best Execution: There is More Than Meets the Eye Bobsguide.com, Jan. 15, 2016 (Year: 2016).*
Using Execution Benchmarks—Why? Bestx.co.uk, Apr. 9, 2016 (Year: 2016).*
Gravey, Ryan et al., Intraday time and order execution quality dimensions Journal of Financial Markets, vol. 12, 2009 (Year: 2009).*
U.S. Appl. No. 16/430,220 (U.S. Pat. No. 10,789,648), filed Jun. 3, 2019 (Sep. 29, 2020).
U.S. Appl. No. 15/473,968 (U.S. Pat. No. 10,346,917), filed Mar. 30, 2017 (Jul. 9, 2019).
U.S. Appl. No. 16/430,220, Aug. 26, 2020 Issue Fee Payment.
U.S. Appl. No. 16/430,220, May 26, 2020 Notice of Allowance.
U.S. Appl. No. 16/430,220, May 18, 2020 Response to Non-Final Office Action.
U.S. Appl. No. 16/430,220, May 1, 2020 Applicant Initiated Interview Summary.
U.S. Appl. No. 16/430,220, Feb. 26, 2020 Non-Final Office Action.
U.S. Appl. No. 15/473,968, Jun. 3, 2019 Issue Fee Payment.
U.S. Appl. No. 15/473,968, Mar. 13, 2019 Notice of Allowance.
U.S. Appl. No. 15/473,968, Mar. 13, 2019 Applicant Initiated Interview Summary.
U.S. Appl. No. 15/473,968, Mar. 1, 2019 Notice of Allowance.
U.S. Appl. No. 15/473,968, Jan. 31, 2019 Response to Non-Final Office Action.
U.S. Appl. No. 15/473,968, Jan. 30, 2019 Applicant Initiated Interview Summary.
U.S. Appl. No. 15/473,968, Dec. 20, 2018 Non-Final Office Action.
U.S. Appl. No. 16/430,220 (U.S. Pat. No. 10,789,648), filed Aug. 26, 2020 (Sep. 29, 2020).
Bacidore, Jeffrey et al., Quantifying market order execution quality at the New York stock exchange Journal of Financial Markets, vol. 6, 2003 (Year: 2003).
Boehmer, Ekkehart, Dimensions of execution quality: Recent evidence for US equity markets Journal of Financial Economics, vol. 78, 2005 (Year: 2005).
Garvey, Ryan et al., Intraday time and order execution quality dimensions Journal of Financial Markets, vol. 12, 2009 (Year: 2009).
Kanji, Gopal K., 100 Statistical Tests—Third Edition SAGE Publications, 2006 (Year: 2006).
Ling, Dana Lee, Introduction to Statistics Using LibreOffice.org Calc Apache OpenOffice.org Calc and Gnumerica—Edition 5.3 College of Micronesia—FSM—May 24, 2015 (Year: 2015).
Standard deviation of timeseries data (MATLAB) Mathworks, Apr. 24, 2016, retrieved from www.mathworks.com (Year: 2016).
Zscore (MATLAB) Mathworks, Feb. 2013, retrieved from www.mathworks.com (Year: 2013).

* cited by examiner

ORDER EXECUTION QUALITY OF FINANCIAL MARKET TRANSACTIONS UTILIZING AN ADJUSTED Z-SCORE BENCHMARK

CROSS REFERENCE TO RELATED APPLICATIONS

This application is a continuation of U.S. patent application Ser. No. 16/430,220 filed Jun. 3, 2019, which is a continuation of U.S. patent application Ser. No. 15/473,968 filed Mar. 30, 2017, now U.S. Pat. No. 10,346,917, and entitled "ORDER EXECUTION QUALITY OF FINANCIAL MARKET TRANSACTIONS UTILIZING AN ADJUSTED Z-SCORE BENCHMARK," which claims benefit of priority to U.S. Provisional Patent Application No. 62/317,872 filed Apr. 4, 2016 and entitled "METHOD FOR THE EVALUATION OF ORDER EXECUTION QUALITY," each of which is incorporated herein in its entirety and from each of which priority is claimed.

BACKGROUND

Traders engaged in the trading of market instruments can utilize computer software and hardware tools that provide various graphical user interfaces to display market price data, execute orders, and monitor status of different market conditions or yields. Market instruments can include anything that can be traded in some quantity for a particular price. For example, a market instrument can be goods or a financial product (e.g., stocks, bonds, futures, currency, commodities, or other financial instruments). Market instruments may be "real" and listed on an exchange or "synthetic," such as a combination of real products.

Electronic trading of market instruments has been embraced as the means for buying and selling instruments on various market exchanges throughout the world. Traders can communicate with host computers of the market exchanges or other intermediary host computers coupled to the exchanges via personal computer, mobile device, or any other networked computing platform. Electronic trading allows for display of information regarding market instruments received from the host computer, which can impact the decision making process of the trader with regard to placing trade orders.

Types of information that can impact a trader's decision to trade an instrument include the market price for the instrument, the expected volume of the instrument on the market, the trader's limit price, and, generally, the performance of pending or previously executed orders against benchmarks calculated from market data over a period of time. Such benchmarks can include, for example, the volume-weighted average price for the instrument, and the time-weighted average price for the instrument. Conventionally, information regarding market instruments, such as price quotes, is only available through market data dissemination services provided by the various exchanges. Thus, calculating benchmarks and evaluating order execution quality is often limited by the degree of access the user has to market data dissemination services, and the user's ability to extract relevant price data using those services.

The ability to visualize these metrics over time through a graphical user interface can be useful both to traders and their clients in assessing the quality of their investments and informing future order decisions. For example, the quality of a trader's order execution strategy can be assessed against known and historical prices and market trade information.

However, the evaluation of order execution quality using such conventional benchmarks based on market trade information often fails to provide a complete picture. Conventional benchmarks can suffer from contextualization issues, thus causing order performance comparison problems across markets, instruments, order duration, and other factors. Additionally, due to limited access to price quotes and potential for manipulation in calculating the conventional benchmarks, clients may be unable to attain an objective evaluation of order execution quality that captures the total price movement of the market instrument. Accordingly, there is a continued need for improved techniques for evaluating order execution quality.

SUMMARY

The present disclosure provides techniques for analyzing and displaying the order execution quality of market instruments traded during the relevant period, or lifetime, of the order. In particular, the present disclosure provides novel analysis and techniques for evaluating the quality of order execution based on quote data available during the lifetime of an order.

In one aspect of the disclosed subject matter, an evaluation system for evaluating the quality of order execution comprises a computing device comprising one or more processors. The processors can be configured to receive and aggregate market information for one or more market instruments on one or more exchanges. The market information can include price quote information for the market instrument during the relevant period, such as the lifetime of the order, wherein the quote information can be the bid, ask, and/or the midpoint prices of the market instrument during the relevant period. The market data can also include market trade information. The computing device can be configured to generate a time-series of quotes for the relevant period.

The computing device can further be configured to calculate the standard deviation of the instrument price ($\sigma$) during the execution of an order. For example, in accordance with an exemplary embodiment, calculation of the standard deviation $\sigma$ can be performed using time weighted quote information over the life of an order rather than market trade information. That is, for purpose of illustration and not limitation, the time weighted standard deviation of the instrument price $\sigma$ can be calculated based on the highest bid, lowest ask, mid-price, or other metric descriptive of orders pending in the market.

The computing device can further be configured to calculate an expected standard deviation of the execution price for an order traded using N trades. For example, the computing device can be configured to calculate the standard deviation of the execution for an order based on the standard deviation of the instrument price ($\sigma$) using N trades during the relevant period of the order, for example, using the formula below:

$$\sigma_N = \frac{\sigma}{\sqrt{N}}$$

N=the number of trades executed during the relevant period
$\sigma$=the standard deviation of the instrument price which may be weighted according to the benchmark (such as, for example, time-weighted for the Time Weighted Average Price (TWAP) or volume-weighted for the VWAP)

$\sigma_N$=the expected standard deviation of order execution prices executed by N random trades Using the standard deviation of the instrument price, the computing device can be configured to calculate a normalized benchmark for assessing order execution quality. The normalized benchmark is the adjusted Z score of the trade, which can be calculated based on one of the fair price (denoted below for example, as $P_B$), the price of the execution (denoted below for example as P), and the average spread (denoted below for example as <Spread>). For example, the fair price can be the interval Time Weighted Average Price (TWAP), the interval Volume Weighted Average Price (VWAP), or the arrival price of the order.

Furthermore, and as embodied herein, the adjusted Z score refers to a statistical measurement of the execution price of an instrument in relation to the average price of the instrument, which is adjusted by the spread. As embodied herein, the spread is the difference between a bid price and an ask price for a particular financial instrument. Additionally, the spread can be a price difference between yields. Still further measures for the spread are contemplated. As herein disclosed, the spread can be influenced by a number of market factors, such as, for example, the number of shares outstanding for a given financial instrument, demand for the instrument, total trading activity, liquidity, and the like. For the purpose of explanation, and not limitation, the spread can be understood as a proxy for the variance in determining the adjusted Z score. As such, the spread can incorporate one or more aspects of market dynamics into the determination of the adjusted Z score and provide traders with greater accuracy in regard to order execution performance.

As embodied herein, the adjusted Z score normalized benchmark for a buy or sell order can be calculated using the formula below:

$$Z = \frac{P_B - P}{\sqrt{[\sigma_N]^2 + \left[\frac{\langle \text{Spread} \rangle}{2}\right]^2}}$$

Z=the adjusted Z score
$\sigma_N$=the expected standard deviation of the order execution price by N random trades
$P_B$=the benchmark price (fair)
<Spread>=the average spread
P=the average execution price of the order
Note: for sell orders, the sign in the above formula should be reverted.

As herein disclosed, the adjusted Z score benchmark can represent the quality of an order execution compared to random executions during the relevant period. In certain embodiments, the adjusted Z score can be displayed as a text overlay on other market instrument charting or visualization tools, and/or alternatively, can be displayed as a standalone graphical display in the form of a two dimensional plot. Threshold values can indicate ranges of poor and/or exceptional execution quality. In certain embodiments, adjusted Z score values from many orders may be ranked. For example, the adjusted Z score can center around zero such that the highest and/or lowest scores can indicate poor performance. In certain embodiments, other adjusted Z score threshold values can be applied to indicate execution quality.

In another aspect of the disclosed subject matter, the adjusted Z score benchmark can represent the quality of an order execution for limit orders, where the price of the order given to the broker can be capped by a limit price. The time weighted average price, standard deviation, and adjusted Z score can reflect all market prices within the limit.

In still another aspect of the disclosed subject matter, the quality of an order execution can be expressed as a percentage of orders which can be expected to be worse than a given confidence limit, such as, for example, a 95% limit. The determination of such a confidence limit and/or confidence interval can be achieved using a normal distribution of order prices based on a time weighted standard deviation.

In yet another aspect of the disclosed subject matter, the evaluation system, as embodied herein, can be configured to transform the adjusted Z score into an economic value. For example, the economic value determined from the adjusted Z score can be a price indicating the amount overpaid or underpaid for $1.00 of an executed order. The transformed adjusted Z score can reflect a trader's order quality and performance in terms of a dollar amount in relation to the normal distribution of executed orders.

As herein disclosed, the number of trades, or fills, used to trade the order can be replaced in the formulas provided with a number of slices, or smaller transactions that total the order, which were actually used to trade the order in the market.

Additionally, and/or alternatively, the number of fills used to trade the order can be replaced in the formulas provided with a recommended number of slices which could have been used to slice the order. This recommended number of slices can be obtained in a number of different ways, including, but not limited to, the total order size divided by the average trade size in the market for the instrument being traded.

DETAILED DESCRIPTION

Figure 1:
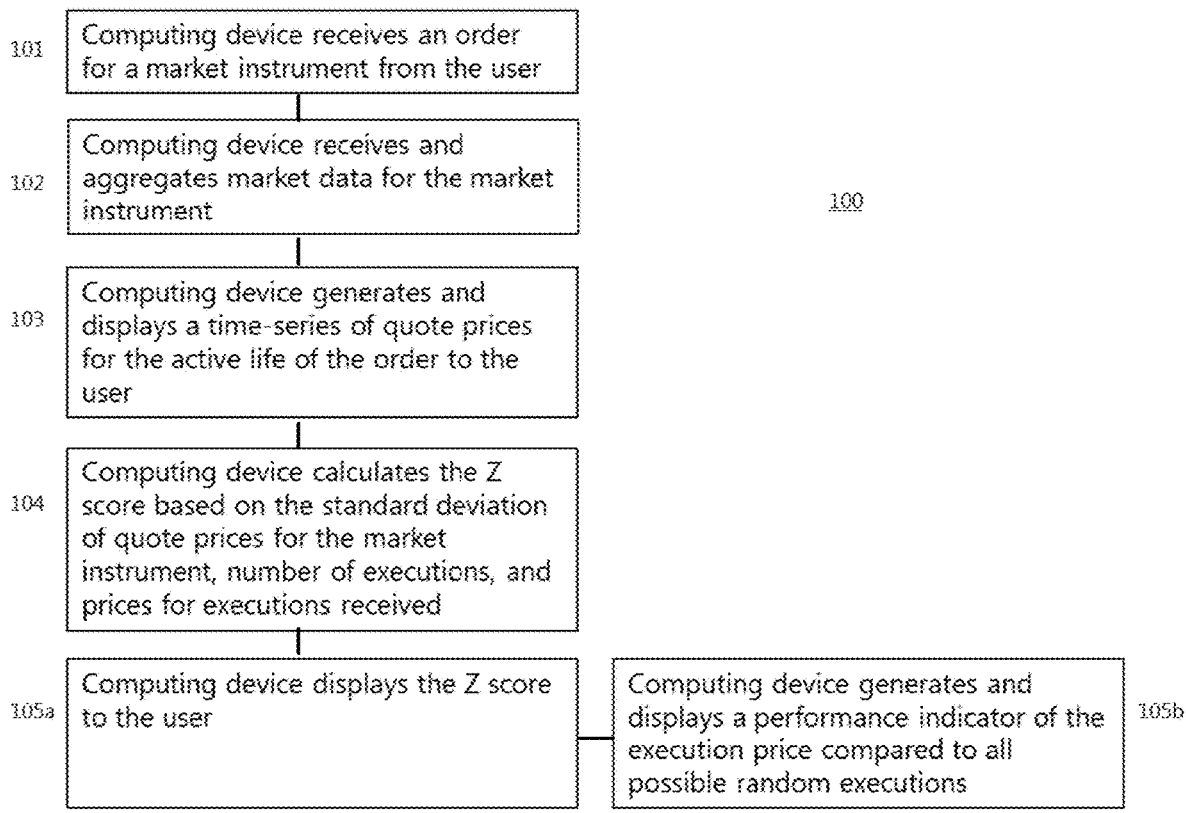
FIG. 1 schematically illustrates a series of operations for evaluating order execution quality, according to one embodiment disclosed herein.

To measure past order performance and to make future decisions, a trader can utilize software products that calculate benchmarks and generate graphical user interfaces, which enable the trader to compare order history to market metrics conventionally displayed as charts graphed as some variable, such as price, versus time. Conventional benchmarks and metrics to assess order quality often make comparisons against the trade price of a given market instrument. For example, it is common to evaluate order execution quality by assessing whether or not the market instrument traded at or better than the Volume-Weighted Average Price (VWAP), which is an order execution strategy benchmarked to the average realized price of the particular market instrument over time, usually one day.

While widely used for their simplicity of calculation and understanding, such conventional benchmarks as VWAP are limited in their ability to provide a comprehensive evaluation of order execution quality across markets, market instruments, order duration, and order size, among other variables, because they are based on market trades. Additionally, such conventional benchmarks can suffer from manipulation, whereby the trader can exercise control over the benchmark by increasing the pace of execution or participation in the market. The presently disclosed subject matter provides techniques for analyzing the quality of order execution based on the total price action of the instrument during the trading period, i.e., the quote information during the relevant period.

As embodied herein, the adjusted Z score refers to a statistical measurement of the execution price of an instrument in relation to the average price of the instrument, which is adjusted by the spread. As embodied herein, the spread can generally be the difference between two similar measures. For example, the spread can be the difference between a bid price and an ask price for a particular financial instrument. Additionally, the spread can be a price difference between yields. Still further measures for the spread are contemplated. As herein disclosed, the spread can be influenced by a number of market factors, such as, for example, the number of shares outstanding for a given financial instrument, the demand for the instrument, the total trading activity, liquidity, and the like. For the purpose of explanation, and not limitation, the spread can be understood as a proxy for the variance in determining the adjusted Z score. As such, the spread can incorporate one or more aspects of market dynamics into the determination of the adjusted Z score and provide traders with greater accuracy in regard to order execution performance. The evaluation system disclosed herein can allow for comparison of order execution quality across all instruments, order duration, order size, and other variables. Additionally, using quotes reduces the potential for benchmark manipulation. The disclosed subject matter also provides improved, unconventional techniques for displaying the herein described benchmark related to the performance of trade orders on a graphical user interface as a text overlay or alternatively as a standalone graphical display. The evaluation system in accordance with embodiments of the presently disclosed subject matter can also be configured to provide a tool for compliance purposes to extract trade orders which have been poorly traded in relation to the market prices available during the trading period, such as, for example, where an adjusted Z-score is greater than 3 or less than 3.

Certain exemplary and non-limiting embodiments of the disclosed subject matter will be described below with reference to the figures, for the purposes of illustration, and not limitation. It should be apparent, however, to those skilled in the art that many more modifications besides those described herein are possible without departing from the concepts of the disclosed subject matter. Additionally, it should be apparent to one of ordinary skill in the art that the unconventional techniques disclosed herein can be combined with other market display techniques.

As disclosed herein, the evaluation system in accordance with embodiments of the presently disclosed subject matter can comprise various hardware and software components, including a computing device having one or more processors. The computing device can be coupled via a network to one or more exchanges. The computing device can be configured to receive real time and historical market information for a plurality of market instruments. Such market information can include market trade information, and bid, ask, and/or midpoint price quotes for market instruments on one or more exchanges. Additionally, the computing device having the one or more processors can be configured with one or more software components to provide an order entry interface enabling a user to communicate with the evaluation system. Accordingly, the one or more software components can be configured to provide communication via a standardized electronic messaging protocol, such as FIX or SWIFT, and alternatively or additionally, via an entry dialogue box.

The computing device can be configured to generate a time-series of quotes for the relevant period. The computing device can further be configured to calculate the standard deviation of the instrument price ($\sigma$) during the relevant period based on the quote information. In accordance with an exemplary embodiment, the relevant period can be, e.g., from the time a particular order is placed by a trader until that order has fully executed or is canceled. Additionally or alternatively, the standard deviation $\sigma$ can be calculated from the time of first execution of an order placed by a trader until that order has fully executed or is canceled.

The computing device can further be configured to calculate the expected standard deviation of the execution price ($\sigma_N$) for an order trading using N trades. For example, the standard deviation of the execution price can be calculated based on the quotes and using N trades, employing the formula below:

$$\sigma_N = \frac{\sigma}{\sqrt{N}}$$

N=the number of trades executed during the relevant period $\sigma$=the standard deviation of the instrument price which is weighted according to the benchmark (such as, for example, time-weighted for the TWAP or volume-weighted for the VWAP)

$\sigma_N$=the expected standard deviation of order execution prices executed by N random trades As herein disclosed, the number of trades or fills, N, executed during the relevant period to trade the order, can be replaced with a number of slices, or smaller transactions that total the order, which were actually used to trade the order in the market. Additionally, and/or alternatively, N can be replaced with a recommended number of slices, which could have been used to slice the order. This recommended number of slices can be obtained in a number of different ways, including, but not limited to, the total order size divided by the average trade size in the market for the instrument being traded Using the standard deviation of the instrument price, the computing device can be configured to calculate a normalized benchmark for assessing order execution quality. The normalized benchmark is the adjusted Z score of the price, which can be calculated based off of the fair price, $P_F$, the price of the execution, P, and the average spread, <Spread>. For example, the fair price could be the interval Time Weighted Average Price (TWAP), the interval Volume Weighted Average Price (VWAP), or the arrival price. As embodied herein, the evaluation system can be configured to determine the adjusted Z score for a buy or sell order employing the formula below, for example:

$$Z = \frac{P_B - P}{\sqrt{[\sigma_N]^2 + \left[\frac{\langle \text{Spread} \rangle}{2}\right]^2}}$$

Z=the adjusted Z score
$\sigma_N$=the expected standard deviation of the order execution price by N random trades
$P_B$=the benchmark price (fair)
<Spread>=the average spread
P=the average execution price of the order
Note: for sell orders, the sign in the above formula should be reverted.

One of skill in the art will appreciate that the term "Z score," generally, is used to refer to a metric indicative of the number of standard deviations a value lies above or below a mean (e.g., calculated by dividing the difference between the value and the mean by the standard deviation). For purpose of clarity, and not limitation, the term "adjusted Z score" is used herein to reflect that the adjusted Z score can depend on the spread in addition to the expected standard deviation. For example, with reference to the exemplary equation above, the adjusted Z score can be calculated by including an additional term corresponding to the spread (e.g., half the spread squared) in the denominator.

The following description provides a non-limiting example of one embodiment of the herein described subject matter.

Figure 2:
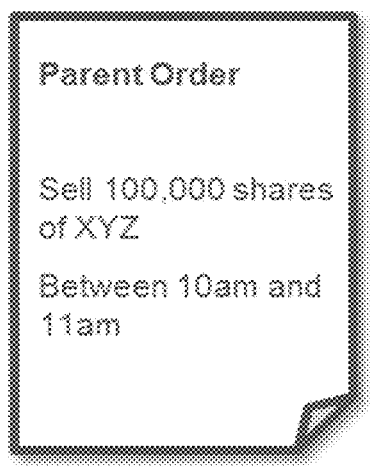
FIG. 2 illustrates an exemplary order entry for a given market instrument during a given relevant period, according to one embodiment disclosed herein.

With reference to FIG. 1, the computing device of the evaluation system configured with the one or more processors can perform the method 100. At step 101, the software components of the computing device can be configured to receive an order for a market instrument from a user through an order entry interface, rendered via a graphical user interface (GUI). The order entry interface can display to a user order parameters that define orders to be executed on one or more exchanges. Order parameters can include for example, the market instrument, exchange, relevant period, order size, and order type among other parameters. Further, the order entry interface can be configured to accept a variable number corresponding to the number of random executions which represents a reasonable expectation of the number of executions needed to complete the order and against which the quality of the pending execution will be compared, and from which the adjusted Z score benchmark can be calculated. Thus, the number of random executions can be analogized to a number of simulated orders executed during the relevant period. Additionally and/or alternatively, a default number of random executions can be automatically entered by the evaluation system if the user does not enter a number. An exemplary order entry is illustrated in FIG. 2 for the sale of 100,000 shares of XYZ between 10 AM and 11 AM.

Figure 3:
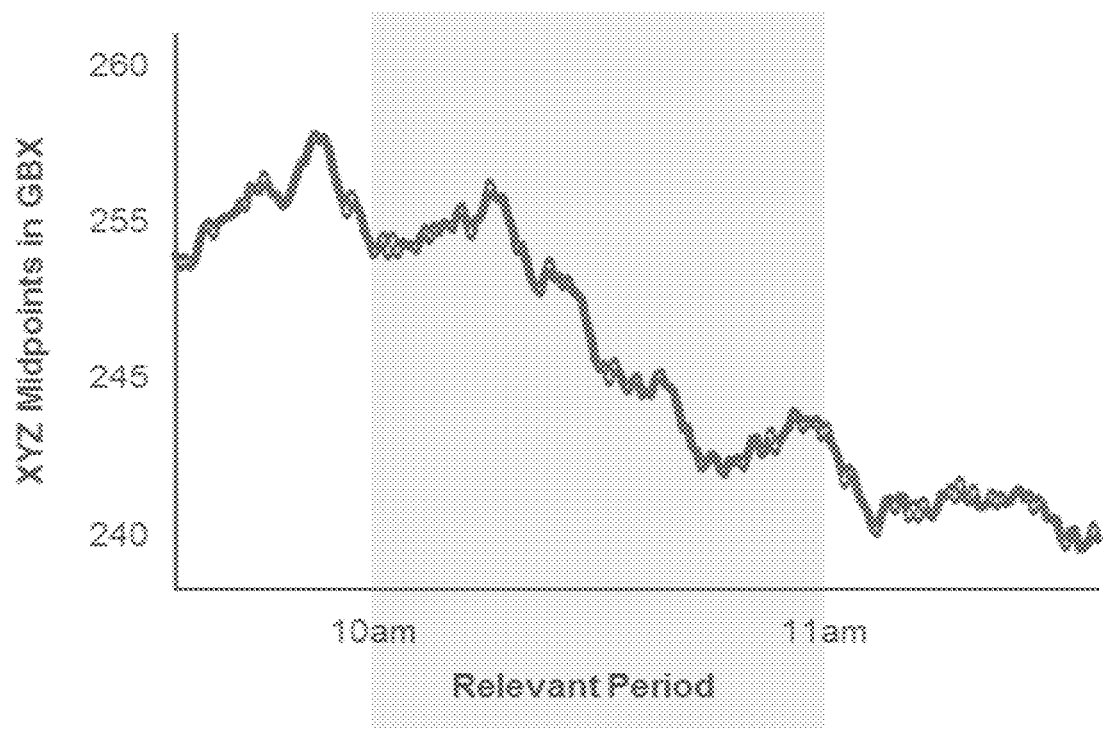
FIG. 3 illustrates an exemplary time-series graph of quotes for a given market instrument, according to one embodiment of the present disclosure.

Based on the order entry information and the number of random executions provided by the user through the order entry interface of the evaluation system, and/or provided as default parameters, the computing device can receive and aggregate market information for the market instrument at step 102. The market information can comprise price quotes of the market instrument during the relevant period, or lifetime of the order, wherein the quote information can be the bid, ask, and/or the midpoint price quotes on an exchange. The market data can also include market trade information, such as the price of executed trades. In the example of the order entry of FIG. 2, the relevant period is the time between 10:00 AM and 11:00 AM, and the market information includes the midpoint quotes of XYZ shares. The computing device can be configured to generate and display a time-series of quotes for the relevant period at step 103, as illustrated in FIG. 3 with respect to the instant example of the order for sale of 100,000 XYZ shares between 10 AM and 11 AM.

At step 104, the computing device of the evaluation system can calculate the adjusted Z score for evaluating the quality of the order execution. The adjusted Z score is calculated using the standard deviation of quotes for the market instrument and the N number of random executions. With continued reference to the example of XYZ shares, the computing device can be configured to calculate the standard deviation of the instrument price using the midpoint quotes of the instrument during the relevant period between 10:00 AM and 11:00 AM and the adjusted Z-score as calculated above. The TWAP can be useful as a basis for the standard deviation of the price of the market instrument in calculating the order execution quality benchmark (i.e., the adjusted Z score) because, unlike other benchmarks, it is less vulnerable to manipulation and effects of market factors such as order volume, order consideration, spread, liquidity, and volatility. Additionally, the adjusted Z score, unlike other measures, is a dimensionless figure, and thus provides unconventional versatility in evaluating order execution quality.

As embodied herein, the VWAP or arrival price can be used to calculate the standard deviation of the market instrument price in generating the adjusted Z score benchmark.

The following description generates the adjusted Z score based off of a time-weighted standard deviation, by way of example only. Thus, the following formula can be employed for the standard deviation, using the TWAP:

$$TWAP = \frac{\sum t_i P_i}{\sum t_i}$$

TWAP=time weighted average price of the market instrument
$t_i$=time the quote, $P_i$, was available
$P_i$=price at time i By way of continued example of the calculation of the standard deviation using the TWAP, the computing device of the evaluation system can be configured to calculate the variance, which is a measure of price stability of the TWAP, using the following formula:

$$\text{Var}(TWAP) = \frac{\sum t_i (P_i - TWAP)^2}{\sum t_i}$$

Figure 4:
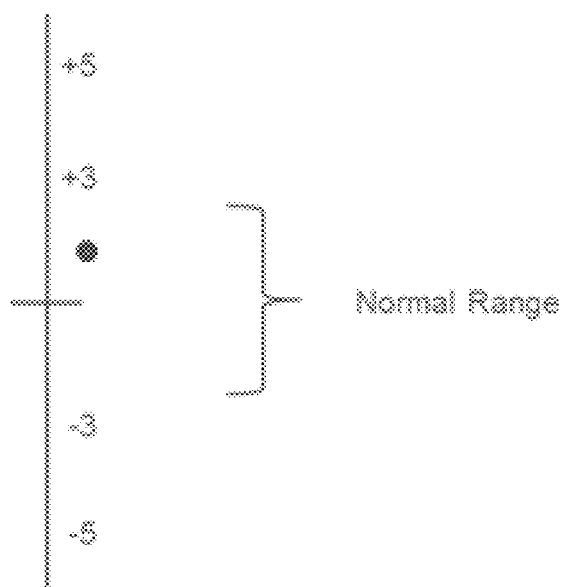
FIG. 4 illustrates an exemplary graphical display for representing a Z score, according to one embodiment of the present disclosure.

Var(TWP)=variance of TWAP
$t_i$=time the quote, $P_i$, was available
$P_i$=price at time i With continued reference to the time-weighted standard deviation, the computing device can simulate the execution of N random orders during the relevant period to generate the adjusted Z score of an executed order. For example, the adjusted Z score of a buy order with n independent, equally sized executions can be calculated using the following formula:

$$Z(n) = \frac{TWAP - P}{\sqrt{[\sigma_{(N)}]^2 + \left[\frac{\langle Spread \rangle}{2}\right]^2}}$$

where the standard deviation of the n executions is calculated based off of the price quotes corresponding to n random executions during the relevant period:

$$\sigma(n) = \frac{\sqrt{Var(TWAP)}}{\sqrt{n}}$$

σ(n)=standard deviation of the average fill price for an order with n executions At step 105a, the computing device can be configured with software components to display the adjusted Z score via a graphical user interface (GUI), either as a text overlay to other market instrument charting or visualization tools, and/or as a standalone graphical display as illustrated by way of example in FIG. 4. In some embodiments, the computing device can be configured with software components to generate a report, print out, visual indicator, graph, chart, or other document containing, displaying, or showing the adjusted Z score therein. In certain embodiments, if the adjusted Z scores greater than 3 or less than −3 are found, they can indicate poor order execution quality. At step 105b, the computing device can be configured to generate and display a GUI such as a performance indicator display depicted by way of example in FIG. 5. In certain embodiments, adjusted Z score values from many orders may be ranked. For example, highest and lowest in a ranked list can indicate the best and worst performing order executions.

Figure 5:
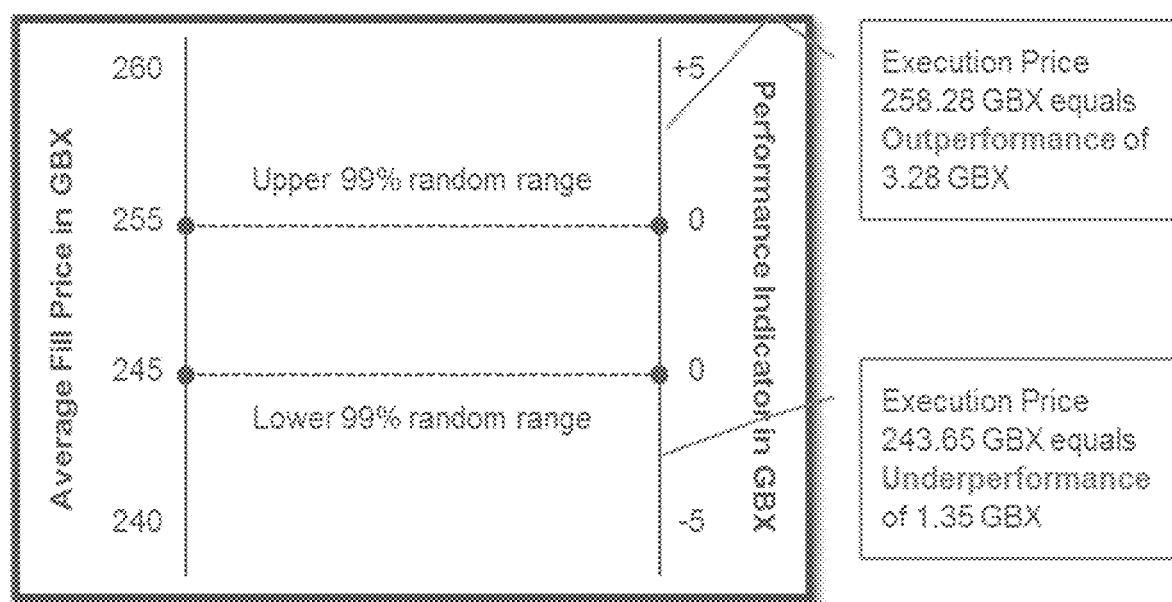
FIG. 5 schematically illustrates an exemplary graphical display for representing execution quality as a consideration value slippage from a 99% confidence range, according to one embodiment disclosed herein.

As herein disclosed, the evaluation system can further be configured to transform the adjusted Z score into an economic value, such as for example, a price, in order to evaluate the performance of the corresponding executed trade. For example, the economic value determined from the adjusted Z score can be a price indicating the amount overpaid or underpaid for every dollar of an executed order. With reference for example, to FIG. 5, the adjusted Z score implies that in relation to the 0.99 confidence interval, the expected execution price has a lower expectation boundary of 245 GBX and an upper expectation boundary of 255 GBX. By way of example, the realized execution price at 258.28 GBX can be transformed into an economic value of 3.28 GBX of over-performance relative to the upper expectation boundary represented by a probability of 0.999. For example, if the realized execution price is above the upper expectation boundary given the adjusted Z score and a certain probability, then the economic value is an over-performance equal to the realized execution price minus the upper expectation boundary. If the realized execution price is below the lower expectation boundary given the adjusted Z score and a certain probability, then the economic value is an under-performance equal to the lower expectation boundary minus the realized execution price. If the realized execution is equal to, or is located between the upper and lower expectation boundary given the adjusted Z score and a certain probability, then the economic value of over- or under-performance equals to zero.

The techniques disclosed herein allow for the comparison of execution quality across market instruments, orders sizes, and other variables via a graphical user interface and other data visualization and/or reporting tools, and can encapsulate evaluation methods using other adjusted Z score thresholds and/or alternatively take into account desirable volume weighting when calculating the standard deviation.

Benefits of the present disclosure include a price benchmark metric that accounts for the behavior of the market price of an instrument during the active period of an order, thus leading to a price-based benchmark which is directly comparable across all instruments, order durations, sizes, etc. Furthermore, the present disclosure allows for the comparison of execution quality across instruments, orders, and days, which, in turn, facilitates analysis and insights which are important to buy and sell side parties. Additionally, the present disclosure utilizes quote information in calculating the normalization factor, which allows for comparisons across instruments, orders, and days for instrument with a publically available price irrespective of executed volume. Moreover, price information is always available. Trade information requires market activity which means that the quality measure is always calculable. Other advantages include that quote is more difficult to manipulate than benchmarks, such as VWAP, and that there is no need for a large peer universe of orders to provide a comparison for execution quality.

Additional benefits of the present disclosure include improving the speed, accuracy, and usability of trader transactions, especially in the context of computerized trading. The evaluation system disclosed allows for comparison of order execution quality across all instruments, order duration, order size, and other variables. Additionally, using quotes reduces the potential for benchmark manipulation.

The present disclosure also provides improved, unconventional techniques for displaying the herein described benchmark related to the performance of trade orders on a graphical user interface as a text overlay or as a standalone graphical display, among other options. The evaluation system disclosed can also be configured to provide a tool for compliance purposes to extract trade orders which have been poorly traded in relation to the market prices available during the trading period, such as, for example, where an adjusted Z-score is greater than 3 or less than 3.

Although one or more embodiments have been described herein in some detail for clarity of understanding, it should be recognized that certain changes and modifications can be made without departing from the spirit of the disclosure. The embodiments described herein can employ various computer-implemented operations involving data stored in computer systems. Furthermore, the embodiments described herein employ various computer-implemented operations which can be adapted to be part of a computer system, the cloud, etc. For example, these operations can require physical manipulation of physical quantities—usually, though not necessarily, these quantities can take the form of electrical or magnetic signals, where they or representations of them are capable of being stored, transferred, combined, compared, or otherwise manipulated. Further, such manipulations are often referred to in terms, such as producing, yielding, identifying, determining, comparing, receiving, storing, calculating, or generating. Any operations described herein that form part of one or more embodiments of the disclosure can be useful machine operations. In addition, one or more embodiments of the disclosure also relate to a device or an apparatus for performing these operations. The apparatus can be specially constructed for specific required purposes, or it can be a general purpose computer selectively activated or configured by a computer program stored in the computer. In particular, various general purpose machines can be used with computer programs written in accordance with the teachings herein, or it can be more convenient to construct a more specialized apparatus to perform the required operations.

The embodiments described herein can be practiced with other computer system configurations including hand-held devices, microprocessor systems, microprocessor-based or programmable consumer electronics, minicomputers, mainframe computers, and the like.

One or more embodiments of the present disclosure can be implemented as one or more computer programs or as one or more computer program modules embodied in one or more computer readable media. The term computer readable medium refers to any data storage device that can store data which can thereafter be input to a computer system—computer readable media can be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Disc), a CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications can be made within the scope of the claims. Accordingly, the described embodiments are to be considered as illustrative and not restrictive, and the scope of the claims is not to be limited to details given herein, but can be modified within the scope and equivalents of the claims. In the claims, elements do not imply any particular order of operation, unless explicitly stated in the claims.

Many variations, modifications, additions, and improvements can be made. Plural instances can be provided for components, operations or structures described herein as a single instance. Boundaries between various components, operations and data stores are somewhat arbitrary, and particular operations are illustrated in the context of specific illustrative configurations. Other allocations of functionality are envisioned and can fall within the scope of the disclosure (s). In general, structures and functionality presented as separate components in exemplary configurations can be implemented as a combined structure or component. Similarly, structures and functionality presented as a single component can be implemented as separate components. It will be apparent to those skilled in the art that various modifications and variations can be made in the method and system of the disclosed subject matter without departing from the spirit or scope of the disclosed subject matter. These and other variations, modifications, additions, and improvements can fall within the scope of the appended claim(s) and their equivalents.

What is claimed is:

1. A computer system for evaluating the quality of at least one order for one or more market instruments during a trading period, the computer system communicatively coupled to a graphical display and one or more market exchange platforms via a network, the computer system comprising:
a processor; and
a memory storing instructions that, when executed by the processor, cause the computer system to:
receive each order for the one or more market instruments during the trading period and associated order parameters, wherein the order parameters define the order for one or more market instruments, via an order entry interface, rendered via a first graphical user interface on the graphical display;
determine a number of random execution points based on the received order parameters or automatically based on at least the total order size divided by the average trade size in a market where the instrument is being traded, if an order parameter was not entered;
display the received and determined order parameters on the first graphical user interface on the graphical display;
receive, over the network, market information for the one or more market instruments via the one or more market exchange platforms, wherein the market information is a combination of the real-time and historic market information and comprises at least price information, bid, ask, or midpoint price quotes of the one or more market instruments, taken at the number of random execution points during the trading period;
aggregate the received market information for the one or more market instruments;
generate and display a dynamic time-series of quotes for the trading period in a time-series graph on a second graphical display, wherein the time series graph illustrates a real-time midpoint quote range for one or more market instruments;
transmit, over the network, instructions to the one or more market exchange platforms to execute each order;
determine an adjusted Z score for the one or more market instruments based on the market information collected at the number of random execution points;
transform the adjusted Z score into a performance price using a time weighted standard deviation of the market information of the one or more market instruments based on at least one of a highest bid, a lowest ask, or a mid-price;
determine a quality rating of each order based on the performance price;
generate and display the determined quality ratings along a first axis representing a numerical value and the performance price on a second axis in a third graphical user interface on the graphical display;
analyze the quality of each order by at least one of comparing the displayed performance price for the one or more market instruments or the displayed quality rating of each order to the market information for the one or more market instruments;
compile each order associated with a low quality-rating that was executed during the trading period wherein the low quality-rating is defined as those with a Z score outside of a user defined range;
generate and display, via a fourth graphical user interface on the graphical display, a compliance report containing at least the adjusted Z score and a realized execution price for only the orders associated with a low quality-rating which were compiled, wherein for each compiled order the compliance report contains a display where the adjusted Z score is plotted along a first axis, price is plotted along a second axis, and upper and lower range limits, based on the time weighted standard deviation, are shown connecting the two axes; and store the compiled orders associated with a low quality-rating and their associated plots from the fourth graphical user interface for further compliance analysis.

2. The computer system of claim 1, wherein the adjusted Z score is determined based on at least one of an interval time weighted average price, an interval volume weighted average price, an arrival price, a price of an execution, and an average spread.

3. The computer system of claim 1, wherein the adjusted Z score is displayed on the graphical user interface as a text overlay, a visualization tool, a standalone score, or a plot.

4. The computer system of claim 1, wherein the standard deviation is calculated from placement of the order to the execution of the order, from the execution of the order to cancellation of the order, or from the placement of the order to the cancellation of the order.

5. A non-transitory computer-readable medium storing instructions that, when executed by a processor, cause a computer system communicatively coupled to a graphical display and one or more market exchange platforms via a network to evaluate the quality of at least one order for one or more market instruments during a trading period, by performing the steps of:
receiving each order for the one or more market instruments during the trading period and associated order parameters, wherein the order parameters define the order for one or more market instruments, via an order entry interface, rendered via a first graphical user interface on the graphical display;
determining a number of random execution points based on the received order parameters or automatically based on at least the total order size divided by the average trade size in a market where the instrument is being traded, if an order parameter was not entered;
displaying the received and determined order parameters on the first graphical user interface on the graphical display;
receiving, over the network, market information for the one or more market instruments via the one or more market exchange platforms, wherein the market information is a combination of the real-time and historic market information and comprises at least price information, bid, ask, or midpoint price quotes of the one or more market instruments, taken at the number of random execution points during the trading period;
aggregating the received market information for the one or more market instruments;
generating and displaying a dynamic time-series of quotes for the trading period in a time-series graph on a second graphical display, wherein the time series graph illustrates a real-time midpoint quote range for one or more market instruments;
transmitting, over the network, instructions to the one or more market exchange platforms to execute each order;
determining an adjusted Z score for the one or more market instruments based on the market information collected at the number of random execution points;
transforming the adjusted Z score into a performance price using a time weighted standard deviation of the market information of the one or more market instruments based on at least one of a highest bid, a lowest ask, or a mid-price;
determining a quality rating of each order based on the performance price;
generating and displaying the determined quality ratings along a first axis representing a numerical value and the performance price on a second axis in a third graphical user interface on the graphical display;
analyzing the quality of each order by at least one of comparing the displayed performance price for the one or more market instruments or the displayed quality rating of each order to the market information for the one or more market instrument;
compiling each order associated with a low quality-rating that was executed during the trading period wherein the low quality-rating is defined as those with a Z score outside of a user defined range;
generating and displaying, via a fourth graphical user interface on the graphical display, a compliance report containing at least the adjusted Z score and a realized execution price for only the orders associated with a low quality-rating which were compiled, wherein for each compiled order the compliance report contains a display where the adjusted Z score is plotted along a first axis, price is plotted along a second axis, and upper and lower range limits, based on the time weighted standard deviation, are shown connecting the two axes; and
storing the compiled orders associated with a low quality-rating and their associated plots from the fourth graphical user interface for further compliance analysis.

6. The non-transitory computer-readable medium of claim 5, wherein the adjusted Z score is displayed on the graphical user interface as a text overlay, a visualization tool, a standalone score, or a plot.

7. The non-transitory computer-readable medium of claim 5, wherein the standard deviation is calculated from placement of the order to the execution of the order, from the execution of the order to cancellation of the order, or from the placement of the order to cancellation of the order.

8. A method for evaluating the quality of at least one order for one or more market instruments during a trading period on a computer system communicatively coupled to a graphical display and one or more market exchange platforms via a network, the method comprising:
receiving each order for the one or more market instruments during the trading period and associated order parameters, wherein the order parameters define the order for one or more market instruments, via an order entry interface, rendered via a first graphical user interface on the graphical display;
determining a number of random execution points based on the received order parameters or as automatically based on at least the total order size divided by the average trade size in a market where the instrument is being traded, if an order parameter was not entered;
displaying the received and determined order parameters on the first graphical user interface on the graphical display;
receiving, over the network, market information for the one or more market instruments via the one or more market exchange platforms, wherein the market information is a combination of the real-time and historic market information and comprises at least price information, bid, ask, or midpoint price quotes of the one or more market instruments, taken at the number of random execution points during the trading period;
aggregating the received market information for the one or more market instruments;
generating and displaying a dynamic time-series of quotes for the trading period in a time-series graph on a second graphical display, wherein the time series graph illustrates a real-time midpoint quote range for one or more market instruments;

transmitting, over the network, instructions to the one or more market exchange platforms to execute each order;

determining an adjusted Z score for the one or more market instruments based on the market information collected at the number of random execution points;

transforming the adjusted Z score into a performance price using a time weighted standard deviation of the market information of the one or more market instruments based on at least one of a highest bid, a lowest ask, or a mid-price;

determining a quality rating of each order based on the performance price;

generating and displaying the quality ratings along a first axis representing a numerical value and the performance price on a second axis in a third graphical user interface on the graphical display;

analyzing the quality of each order by at least one of comparing the displayed performance price for the one or more market instruments or the displayed quality rating of each order to the market information for the one or more market instruments;

compiling each order associated with a low quality-rating that was executed during the trading period wherein the low quality-rating is defined as those with a Z score outside of a user defined range;

generating and displaying, via a fourth graphical user interface on the graphical display, a compliance report containing at least the adjusted Z score and a realized execution price for only the orders associated with a low quality-rating which were compiled, wherein for each compiled order the compliance report contains a display where the adjusted Z score is plotted along a first axis, price is plotted along a second axis, and upper and lower range limits, based on the time weighted standard deviation, are shown connecting the two axes; and storing the compiled orders associated with a low quality-rating and their associated plots from the fourth graphical user interface for further compliance analysis.

9. The method of claim 8, wherein the adjusted Z score is determined based on at least one of an interval time weighted average price, an interval volume weighted average price, an arrival price, a price of an execution, and an average spread.

10. The method of claim 8, wherein the adjusted Z score is displayed on the graphical user interface as a text overlay, a visualization tool, a standalone score, or a plot.

* * * * *